(12) United States Patent
Chebbi et al.

(10) Patent No.: US 11,879,835 B1
(45) Date of Patent: Jan. 23, 2024

(54) DEVICE FOR DETECTING TOXIC ELEMENTS IN PLASTIC PRODUCTS AND DETERMINING POTENTIAL HEALTH RISKS

(71) Applicant: KING FAISAL UNIVERSITY, Al-Ahsa (SA)

(72) Inventors: Kaouther Chebbi, Al-Ahsa (SA); Hesham M. Enshasy, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/233,274

(22) Filed: Aug. 11, 2023

(51) Int. Cl.
*G01N 21/33* (2006.01)
*G08B 21/02* (2006.01)

(52) U.S. Cl.
CPC ............ *G01N 21/33* (2013.01); *G08B 21/02* (2013.01)

(58) Field of Classification Search
CPC .. G01N 21/33; G01N 33/0062; G01N 21/031; G01N 21/3504; G01N 2201/129; G01N 2021/3595; G01N 2033/0068; B81B 7/02; G06N 3/02; G01J 3/108; G01J 3/28; G01J 3/0259; G01J 3/0264; G01J 2003/2879; G01J 3/021; G01J 3/0291; G01J 3/0286; G08B 21/02
See application file for complete search history.

(56) References Cited

U.S. PATENT DOCUMENTS

| 6,051,388 A | 4/2000 | Bodenhamer |
| 7,384,742 B2 | 7/2008 | Montago et al. |
| 10,732,037 B1 | 8/2020 | Reid |

(Continued)

FOREIGN PATENT DOCUMENTS

| CN | 208255179 U | 12/2018 |
| CN | 108181154 B | 4/2023 |

OTHER PUBLICATIONS

FrinGOe "A Spectrometer-On-the-Go" May 31, 2015, p. 1-5 (Year: 2015).*
FrinGOe publication date (Year: 2015).*
X-Ray Detection of Plastics in Food & Beverage Containers, by Peco InspX (website: www.peco-inspx.com/resources/x-ray-detectable-plastics/ accessed online Apr. 3, 2023).

(Continued)

*Primary Examiner* — David P Porta
*Assistant Examiner* — Mamadou Faye
(74) *Attorney, Agent, or Firm* — Nath, Goldberg & Meyer; Richard C. Litman (57) ABSTRACT

A method for detecting for a presence of a toxic element in a sample includes emitting UV light from an UV-VIS LED illuminator onto a sample as incident light. Capturing a portion of the incident light being reflected from the sample using a frinGOe interferometer and converting the reflected light to an interferogram spectrum. Collecting the interferogram spectrum using a camera. Retrieving the interferogram spectrum from the camera and transforming it to absorption wavelength spectrum using Fourier transformation via a microcontroller. Comparing and normalizing the absorption strength peak wavelength using the microcontroller. Comparing the normalized absorption strength peak wavelength spectrum with stored allowable toxic chemical absorption strength peak wavelength thresholds. Sending a message indicating that the sample is safe or not safe to use to a LCD screen and a speaker based on the comparison between the normalized absorption strength peak wavelength spectrum and the stored allowable thresholds.

19 Claims, 4 Drawing Sheets

(56) References Cited

U.S. PATENT DOCUMENTS

| | | | |
|---|---|---|---|
| 11,175,246 B2 | 11/2021 | Lintern | |
| 11,490,852 B1 | 11/2022 | Kurani et al. | |
| 2012/0056093 A1* | 3/2012 | Poteet | G01J 3/02 |
| | | | 250/363.01 |
| 2019/0226947 A1 | 7/2019 | Young et al. | |
| 2020/0049800 A1* | 2/2020 | Valouch | G01S 17/46 |
| 2020/0076934 A1* | 3/2020 | Boatner | H04N 23/64 |
| 2022/0260517 A1 | 8/2022 | Oja et al. | |
| 2022/0252573 A1 | 11/2022 | Hummer et al. | |
| 2023/0014558 A1* | 1/2023 | Sabry | B81B 7/02 |

OTHER PUBLICATIONS

Detection of Plastics with X-Ray Systems in the Food Industry, by Sesotec (website: www.sesotec.com/apac/en/resources/blog/detection-of-plastics-with-x-ray-systems-in-the-food-industry accessed online Apr. 3, 2023).

De Frond, H. et al., "µATR-FTIR Spectral Libraries of Plastic Particles (FLOPP and FLOPP-e) for the Analysis of Microplastics", Anal. Chem. 93(48): pp. 15878-15885 (2021).

\* cited by examiner

DEVICE FOR DETECTING TOXIC ELEMENTS IN PLASTIC PRODUCTS AND DETERMINING POTENTIAL HEALTH RISKS

FIELD AND BACKGROUND

The disclosure of the present patent application relates to a detection device, and particularly to a system and method of detecting toxic elements in a sample such as plastic product.

DESCRIPTION OF THE PRIOR ART

Plastics have become an integral part of modern life due to their versatility, durability, and cost-effectiveness. It is used in a wide variety of industries including consumer good products and medical devices. Some examples of products made from plastics are phone casings, milk containers, ketchup bottles, food packaging, soft drinks, water bottles, toys, plastic wraps, surgical gloves, and syringes. While plastics offer many advantages, there have been concerns toward the hazards associated with plastics. Aside from the danger that most plastics are non-biodegradable and therefore accumulate in large quantity in the environment, certain chemicals used in the production of plastics can be harmful to human. Certain plastic manufacturing processes involve the addition of toxic chemicals or elements such as heavy metals, Phthalates, and Bisphenol A. There has been a concern that these toxic chemicals or elements may leech from plastic products, such as food packaging and water bottles, into food and beverages, causing health risks to the end user of the products. Thus, a system and method of detecting toxic elements in a sample such as plastic product for solving the aforementioned problems is desired.

SUMMARY

The present subject matter relates to a hand-held portable toxic element detection system which, in one embodiment, includes a housing having a first portion, a second portion, and a third portion. The second portion being located between the first portion and the third portion of the housing. The first portion, the second portion, and the third portion of the housing each have a top surface and a bottom surface. An on/off button is located on the top surface of the first portion of the housing. A scan switch is located on the bottom surface of the first portion of the housing. A speaker is located on the top surface of the second portion of the housing. A LCD screen and a plurality of LED light indicators are located on the top surface of the third portion of the housing. An UV-VIS LED illuminator and a frinGOe interferometer are located on the bottom surface of the third portion of the housing. The UV-VIS LED illuminator emits UV light as incident light onto a sample. The frinGOe interferometer captures a portion of the incident light being reflected from the sample as reflected light and converts the reflected light to an interferogram spectrum. A camera disposed within the housing is configured to collect the interferogram spectrum. A microcontroller and a RAM database memory are disposed within the housing. The microcontroller is in communication with the camera, RAM database memory, speaker, LCD screen, UV-VIS LED illuminator, and frinGOe interferometer. The microcontroller retrieves the interferogram spectrum from the camera and transforms the interferogram spectrum to an absorption wavelength spectrum using Fourier transformation. The absorption wavelength spectrum includes an absorption peak wavelength spectrum and an absorption strength peak wavelength spectrum. The microcontroller compares the absorption peak wavelength spectrum and the absorption strength peak wavelength spectrum with absorption peak wavelength spectrum and absorption strength peak wavelength spectrum data stored in the RAM database memory. The stored absorption peak wavelength spectrum and the absorption strength peak wavelength spectrum data indicate presence of toxic chemicals and a corresponding level of toxicity, respectively, in a tested sample. The microcontroller normalizes the absorption strength peak wavelength spectrum according to the stored absorption strength peak wavelength spectrum data. The normalization represents an amount of toxic chemicals in the sample. The microcontroller compares the normalized absorption strength peak wavelength spectrum with stored allowable toxic chemical absorption strength peak wavelength thresholds. The microcontroller sends a visual and audio message indicating that the sample is safe to use to the LCD screen and the speaker, respectively, when the normalized absorption strength peak wavelength spectrum for the amount of all the toxic chemicals in the sample is less than the stored allowable toxic chemical absorption strength peak wavelength thresholds. The microcontroller sends a visual and audio message indicating that the sample is not safe to use to the LCD screen and the speaker respectively when the normalized absorption strength peak wavelength spectrum for the amount of any one of the toxic chemicals in the sample is greater than the stored allowable toxic chemical absorption strength peak wavelength thresholds.

In an embodiment, the first portion of the housing is a handle.

In another embodiment, the bottom surface of the first portion of the housing further includes a rubber handgrip.

In a further embodiment, the plurality of LED light indicators includes a red LED for indicating that the system is on, a yellow LED for indicating that the system is scanning, and a green LED for indicating that the scanning is complete.

In an embodiment, the plurality of LED light indicators are positioned between the LCD screen and the speaker.

The sample can be plastic in some embodiments.

The camera is a Raspberry Pi camera in some embodiments.

The microcontroller is a Raspberry Pi microcontroller in some embodiments.

In certain embodiments, the microcontroller further includes sending a type of toxic chemicals detected in the sample and its toxicity level to the LCD screen to be displayed thereon.

In a further embodiment, the present subject matter relates to a method for detecting for a presence of a toxic element in a sample, the method including: providing a sample to be tested; turning on a hand-held portable toxic element detection system by pressing an on/off button disposed thereon; directing an UV-VIS LED illuminator from the hand-held portable toxic element detection system toward the sample to be tested; pressing a scan switch disposed on the hand-held portable toxic element detection system to initiate a scanning process which includes emitting UV light from the UV-VIS LED illuminator onto the sample to be tested as incident light; capturing a portion of the incident light being reflected from the sample as reflected light using a frinGOe interferometer disposed on the hand-held portable toxic element detection system and converting the reflected light to an interferogram spectrum; collecting the interferogram spectrum using a camera disposed within the hand-held portable toxic element detection system; retrieving the interferogram spectrum from the camera via a microcontroller, the microcontroller and a RAM database memory disposed within the hand-held portable toxic element detection system; transforming the interferogram spectrum to absorption wavelength spectrum using Fourier transformation via the microcontroller, the absorption wavelength spectrum includes an absorption peak wavelength spectrum and an absorption strength peak wavelength spectrum; comparing, using the microcontroller, the absorption peak wavelength spectrum and the absorption strength peak wavelength spectrum with absorption peak wavelength spectrum and absorption strength peak wavelength spectrum data stored in the RAM database memory, the stored data absorption peak wavelength spectrum and the absorption strength peak wavelength spectrum data indicate a presence of toxic chemicals and a corresponding level of toxicity of the toxic chemicals in the sample, respectively; normalizing the absorption strength peak wavelength spectrum according to the stored data absorption strength peak wavelength spectrum data using the microcontroller, the normalization represents an amount of toxic chemicals in the sample; comparing the normalized absorption strength peak wavelength spectrum with stored allowable toxic chemical absorption strength peak wavelength thresholds; sending a visual and audio message indicating that the sample is safe to use to an LCD screen and a speaker, respectively, when the normalized absorption strength peak wavelength spectrum for all toxic chemicals in the sample is less than the stored allowable toxic chemical absorption strength peak wavelength thresholds; and sending a visual and audio message indicating that the sample is not safe to use to the LCD screen and the speaker, respectively, when the normalized absorption strength peak wavelength spectrum for any toxic chemical in the sample is greater than the stored allowable toxic chemical absorption strength peak wavelength thresholds.

In an embodiment, the hand-held portable toxic element detection system further includes a housing which includes a first portion, second portion, and third portion. The second portion of the housing can be located between the first portion of the housing and the third portion of the housing. The first portion, second portion, and third portion of the housing can each include a top surface and a bottom surface. The top surface and bottom surface of the first portion of the housing can include the on/off button and the scan switch, respectively. The top surface of the second portion of the housing can include the speaker. The top surface of the third portion of the housing can include the LCD screen and a plurality of LED light indicators. The bottom surface of the third portion of the housing can include the UV-VIS LED illuminator and the frinGOe interferometer. The camera can be disposed within the housing. The microcontroller can be in communication with the camera, RAM database memory, speaker, LCD screen, UV-VIS LED illuminator, and frinGOe interferometer.

In certain embodiments, the first portion of the housing is a handle.

In other embodiments, the bottom surface of the first portion of the housing further includes a rubber handgrip.

In additional embodiments, the plurality of LED light indicators includes a red LED for indicating that the system is on, a yellow LED for indicating that the system is scanning, and a green LED for indicating that the scanning is complete.

In an embodiment, the plurality of LED light indicators are positioned between the LCD screen and the speaker.

The sample is plastic in some embodiments.

The camera is a Raspberry Pi camera in some embodiments.

The microcontroller is a Raspberry Pi microcontroller in some embodiments.

The microcontroller can further be configured for sending a type of toxic chemicals detected in the sample and its toxicity level to the LCD screen to be displayed thereon.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

The present subject matter relates to a user-friendly, sleek and modern hand-held portable toxic element detection system for detecting for a presence of a toxic element in a sample.

Figure 1:
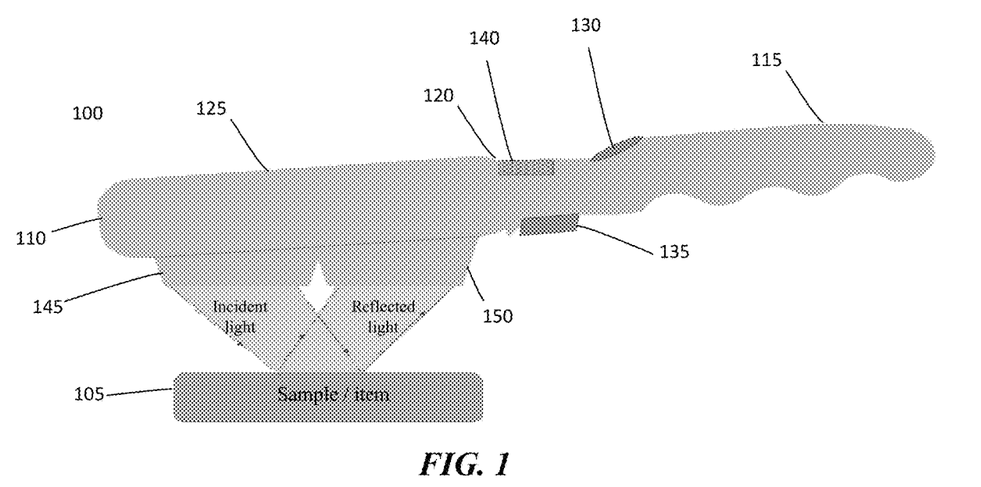
FIG. 1 is a side view of the hand-held portable toxic element detection system for detecting for presence of a toxic element in a sample.

FIG. 1 is a side view of a sleek hand-held portable toxic element detection system 100 for detecting for presence of a toxic element in a sample 105. It includes a housing 110 comprising a first portion 115, a second portion 120, and a third portion 125, the second portion being located between the first portion and the third portion of the housing, and the first portion, the second portion, and the third portion of the housing each having a top surface and a bottom surface. The first portion 115 of the housing 110 is a smooth handle. The top surface of the first portion 115 of the housing 110 has an on/off button 130 located thereon. The bottom surface of the first portion 115 of the housing 110 has a scan switch 135 located thereon. The top surface of the second portion 120 of the housing 110 has a speaker 140 located thereon. The bottom surface of the third portion 125 of the housing 110 has an UV-VIS LED illuminator 145 and a frinGOe interferometer 150 located thereon. The frinGoe interferometer 150 is a patented technology as described by its manufacturer which uses an equivalent non-scanning FT interferometer. According to the manufacturer, FrinGOe uses innovative crystal technology to create a low cost 2 D array of Mach Zehnder Interferometers and patented optical configuration to map an array onto a camera sensor. This allows an all-passive and compact optical add-on (as small as 4 mm by 4 mm by 2 mm) that can be mounted onto any imaging platforms such as Raspberry Pi camera or other imaging devices. The 2 D interferometer array of FrinGOe is explained by the manufacturer as utilizing every pixel to perform FT spectroscopy. Each row of the sensor array is used to produce a 3264-points interferogram, and 2448 interferograms are captured in one snapshot for 8 MegaPixel type camera. A microcontroller, such as a microcontroller 175 shown in FIG. 5, will read and save these interferograms and average the data to get one averaged set of data. This step will reduce the noise and allow for more accurate scan of samples, such as sample 105. Once an averaged interferogram is extracted the microcontroller will do Fourier transformation on the data to extract an absorption wavelength spectrum out of it.

Figure 2:
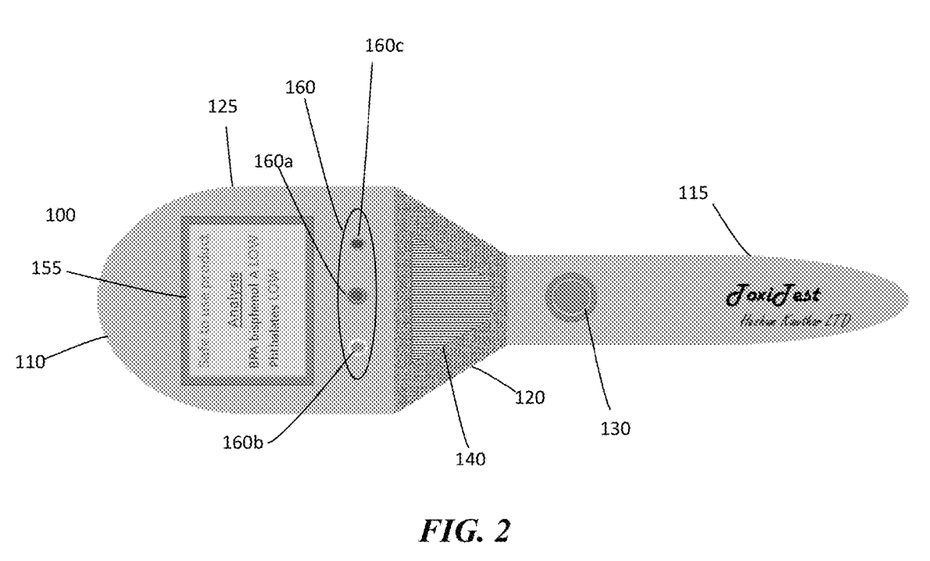
FIG. 2 is a top view of a hand-held portable toxic element detection system.

FIG. 2 is a top view of the hand-held portable toxic element detection system 100 with a LCD screen 155 and a plurality of LED light indicators 160 located on the top surface of the third portion 125 of the housing 110. The plurality of LED light indicators 160 comprises a red LED 160a configured to indicate the system is on, a yellow LED 160b configured to indicate the system is scanning, and a green LED 160c configured to indicate the scanning is complete. The plurality of LED light indicators 160 are positioned between the LCD screen 155 and the speaker 140.

Figure 3:
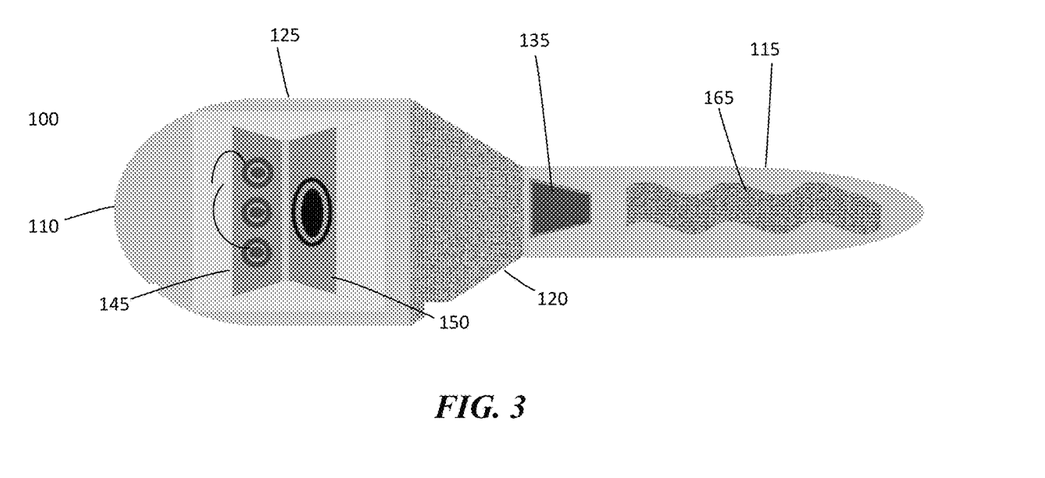
FIG. 3 is a bottom view of the hand-held portable toxic element detection system.

FIG. 3 is a bottom view of the hand-held portable toxic element detection system 100 with the UV-VIS LED illuminator 145 and the frinGOe interferometer 150 located on the bottom surface of the third portion 125 of the housing 110. As shown in FIG. 3, the UV-VIS LED illuminator 145 and the frinGOe interferometer 150 are at right angles of each other to illuminate and receive light rays. The bottom surface of the first portion 115 of the housing 110 also include a rubber handgrip 165 for comfort and smooth use by an end user.

Figure 4:
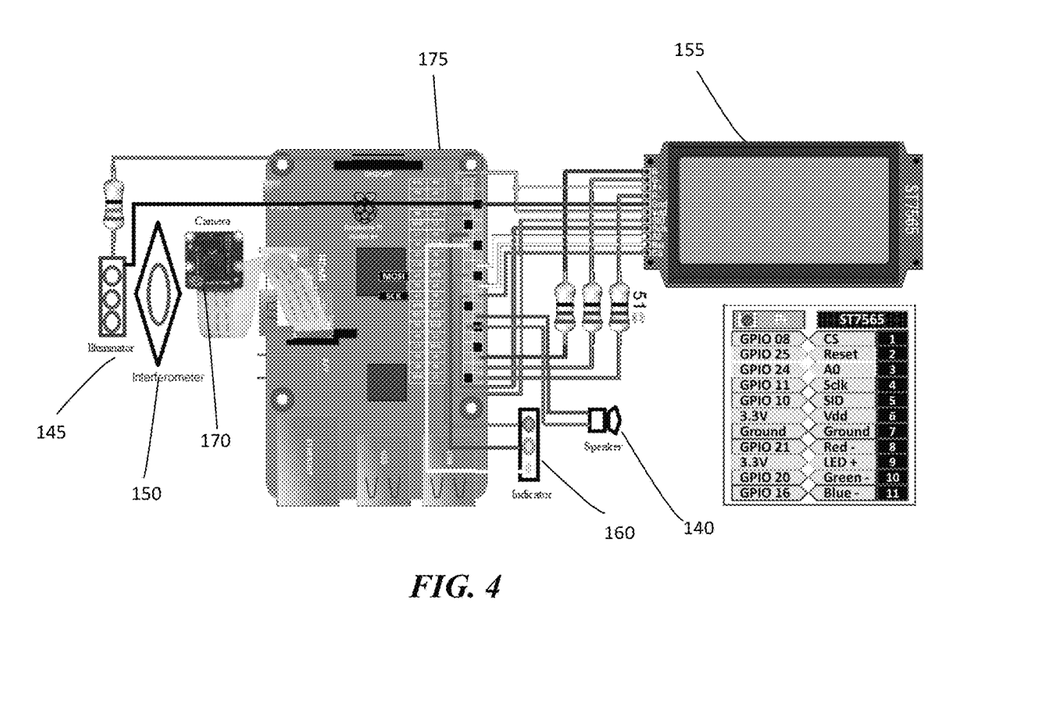
FIG. 4 is an illustration of an electronic circuit schematics of the hand-held portable toxic element detection system.
Figure 5:
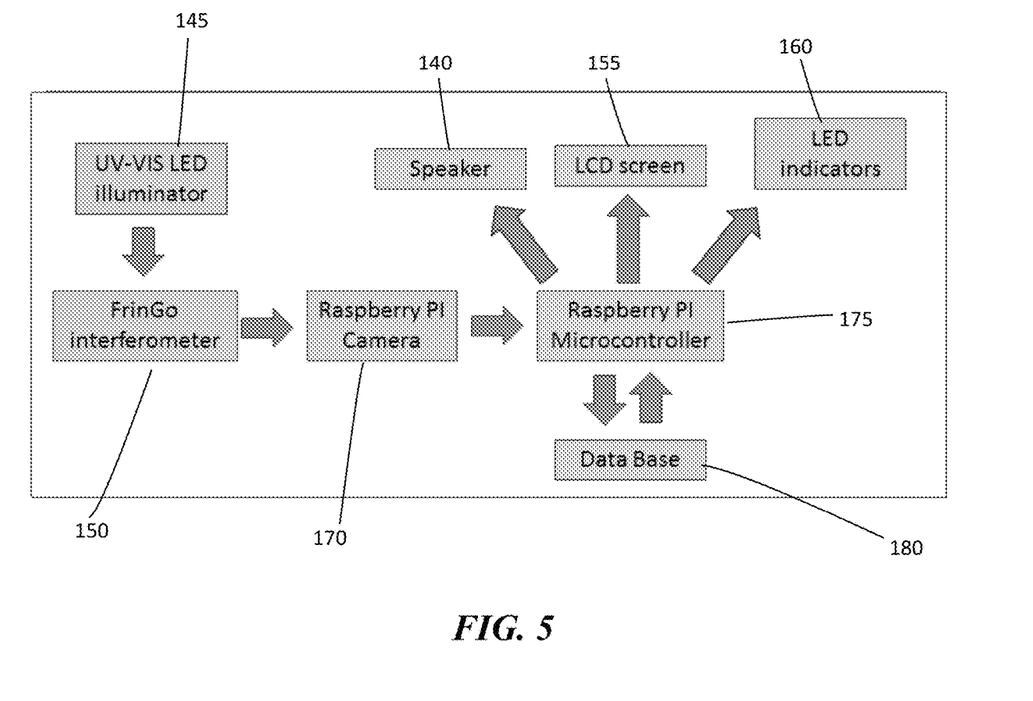
FIG. 5 is a block diagram of a method for detecting for a presence of a toxic element in a sample.

FIG. 4 is an illustration of an electronic circuit schematics of the hand-held portable toxic element detection system with all wiring connections which includes a camera 170 and a microcontroller 175 disposed within the housing 110. A RAM database memory 180, shown in FIG. 5, is also disposed within the housing 110. The microcontroller 175 is configured to be in communication with the camera 170, RAM database memory 180, speaker 140, LCD screen 155, UV-VIS LED illuminator 145, and frinGOe interferometer 150. The camera 170 and microcontroller 175 are Raspberry Pi camera and Raspberry Pi microcontroller. More specifically, the Raspberry Pi microcontroller is a Raspberry Pi Model B+ microcontroller. The camera 170 is connected to a camera slot of the Raspberry Pi microcontroller 175. The speaker 140, LCD screen 155, UV-VIS LED illuminator 145, and plurality of LED light indicators 160 use I/O pins of the Raspberry Pi microcontroller 175. The pin configuration of the LCD screen 155 and its partner microcontroller 175 is demonstrated on the right lower corner of the figure.

FIG. 5 is a block diagram of a method for detecting for a presence of a toxic element in the sample 105 using the hand-held portable toxic element detection system 100. The process starts with providing the sample 105, such as plastic product, to be tested. Turning on the hand-held portable toxic element detection system 100 by pressing the on/off button 130 located on the top surface of the first portion 115 of the housing 110. When the hand-held portable toxic element detection system 100 is turned on, the red LED 160a from the plurality of LED light indicators 160, located on the top surface of the third portion 125 of the housing 110, will be on. The user will direct the UV-VIS LED illuminator 145, located the bottom surface of the third portion 125 of the housing 110, towards the sample 105. Pressing the scan switch 135, located on the bottom surface of the first portion 115 of the housing 110, initiates a scanning process. During the scanning process, the yellow LED 160b from the plurality of LED light indicators 160, located on the top surface of the third portion 125 of the housing 110, will be on. Also during the scanning process, UV light from the UV-VIS LED illuminator 145 is emitted onto the sample 105 as incident light to illuminate the sample 105. Depending on the composition of the sample 105, a portion of the incident light will be absorbed by the sample 105 while a portion of the incident light will be reflected off of the sample 105 as reflected light.

The frinGoe interferometer 150, located on the bottom surface of the third portion 125 of the housing 110, captures the reflected light and converts the reflected light to an interferogram spectrum. When the scanning is complete, the green LED 160c from the plurality of LED light indicators 160, located on the top surface of the third portion 125 of the housing 110, will be on. The camera 170, disposed within the housing 110 and behind the frinGoe interferometer 150, collects the interferogram spectrum. The collecting step involves the camera 170 taking an image of the interferogram spectrum to generate a raw camera pixel representing the interferogram spectrum. The microcontroller 175, disposed within the housing 110, retrieves the interferogram spectrum from the camera 170 and transform the interferogram spectrum to absorption wavelength spectrum using Fourier transformation.

The absorption wavelength spectrum comprises an absorption peak wavelength spectrum and an absorption strength peak wavelength spectrum. The microcontroller 175 compares the absorption peak wavelength spectrum and the absorption strength peak wavelength spectrum with absorption peak wavelength spectrum and absorption strength peak wavelength spectrum data stored in the RAM database memory 180. The stored data absorption peak wavelength spectrum and the absorption strength peak wavelength spectrum data indicate a presence of toxic chemicals and a corresponding level of toxicity of the toxic chemicals in the sample 105, respectively. The toxic chemicals the presence of which the sample is tested for can be, but are not limited to, Bisphenol A and Phthalate.

The microcontroller 175 normalizes the absorption strength peak wavelength spectrum according to the stored data absorption strength peak wavelength spectrum data. The normalization represents an amount of toxic chemicals in the sample 105. The microcontroller 175 compares the normalized absorption strength peak wavelength spectrum with stored allowable toxic chemical absorption strength peak wavelength thresholds. The microcontroller 175 sends a visual and audio message indicating that the sample 105 is safe to use to the LCD screen 155 and the speaker 140, respectively, when the normalized absorption strength peak wavelength spectrum for all toxic chemicals in the sample 105 is less than the stored allowable toxic chemical absorption strength peak wavelength thresholds. On the other hand, the microcontroller 175 sends a visual and audio message indicating that the sample 105 is not safe to use to the LCD screen 155 and the speaker 140, respectively, when the normalized absorption strength peak wavelength spectrum for any toxic chemical in the sample 105 is greater than the stored allowable toxic chemical absorption strength peak wavelength thresholds. The microcontroller 175 also sends a type of toxic chemicals detected in the sample 105 and its toxicity level to the LCD screen 155 to be displayed thereon.

Figure 6:
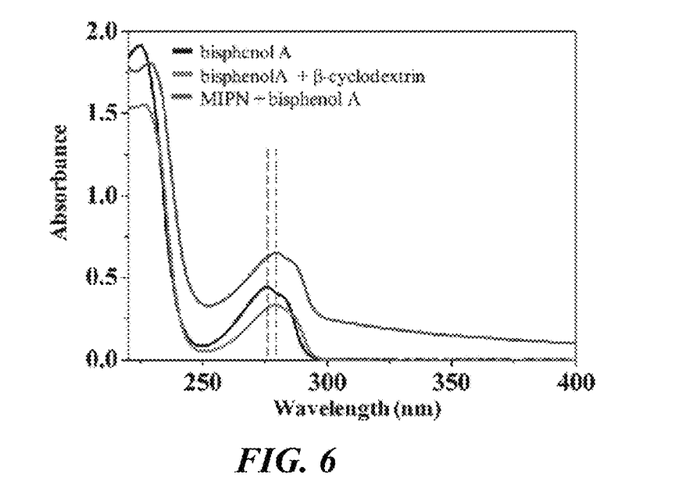
FIG. 6 is a graph illustrating allowable absorption strength peak wavelength spectrum thresholds of a toxic chemical, Bisphenol A, stored in a RAM database memory.
Figure 7:
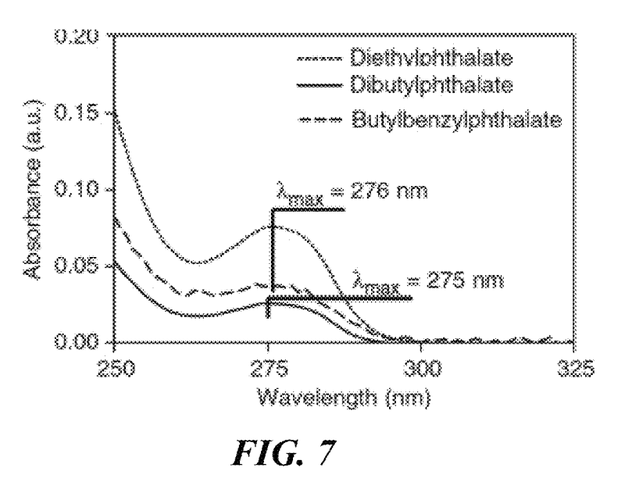
FIG. 7 is a graph illustrating allowable absorption strength peak wavelength spectrum thresholds of a toxic chemical, Phthalate, stored in a RAM database memory.

FIGS. 6-7 are graphs illustrating allowable absorption strength peak wavelength spectrum thresholds of the toxic chemicals, Bisphenol A and Phthalate respectively, stored in the RAM database memory 180. Both figures show strong (strength) absorption peaks wavelengths at 275-277 nm. The normalized absorption strength peak wavelength spectrum as mentioned above would be compared with the strong (strength) absorption peaks wavelengths at 275-277 nm for Bisphenol A and Phthalate as in shown in FIGS. 6-7 via the microcontroller 175.

While FIGS. 6-7 only show Bisphenol A and Phthalate, however other toxic chemicals are within the scope of the present subject matter.

It is to be understood that the system and method of detecting toxic elements in a sample such as plastic product is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A hand-held portable toxic element detection system, the system comprising:
    a housing comprising a first portion, a second portion, and a third portion, the second portion being located between the first portion and the third portion of the housing, and the first portion, the second portion, and the third portion of the housing each have a top surface and a bottom surface;
    an on/off button located on the top surface of the first portion of the housing;
    a scan switch located on the bottom surface of the first portion of the housing;
    a speaker located on the top surface of the second portion of the housing;
    a LCD screen and a plurality of LED light indicators located on the top surface of the third portion of the housing;
        an UV-VIS LED illuminator and a frinGOe interferometer located on the bottom surface of the third portion of the housing, wherein the UV-VIS LED illuminator is configured to emit UV light as incident light onto a sample and wherein the frinGOe interferometer is configured to capture a portion of the incident light being reflected from the sample as reflected light and convert the reflected light to an interferogram spectrum;
    a camera disposed within the housing configured to collect the interferogram spectrum; and
    a microcontroller and a RAM database memory disposed within the housing, wherein the microcontroller is configured to be in communication with the camera, RAM database memory, speaker, LCD screen, UV-VIS LED illuminator, and frinGOe interferometer;
    wherein the microcontroller is configured to:
        retrieve the interferogram spectrum from the camera;
        transform the interferogram spectrum to an absorption wavelength spectrum using Fourier transformation, wherein the absorption wavelength spectrum comprises an absorption peak wavelength spectrum and an absorption strength peak wavelength spectrum;
        compare the absorption peak wavelength spectrum and the absorption strength peak wavelength spectrum with absorption peak wavelength spectrum and absorption strength peak wavelength spectrum data stored in the RAM database memory, wherein the stored absorption peak wavelength spectrum and the absorption strength peak wavelength spectrum data indicate presence of toxic chemicals and a corresponding level of toxicity respectively;
        normalize the absorption strength peak wavelength spectrum according to the stored absorption strength peak wavelength spectrum data, wherein the normalization represents an amount of toxic chemicals in the sample;
        compare the normalized absorption strength peak wavelength spectrum with stored allowable toxic chemical absorption strength peak wavelength thresholds;
        send a visual and audio message indicating that the sample is safe to use to the LCD screen and the speaker, respectively, when the normalized absorption strength peak wavelength spectrum for the amount of all the toxic chemicals in the sample is less than the stored allowable toxic chemical absorption strength peak wavelength thresholds; and
        send a visual and audio message indicating that the sample is not safe to use to the LCD screen and the speaker respectively when the normalized absorption strength peak wavelength spectrum for the amount of any one of the toxic chemicals in the sample is greater than the stored allowable toxic chemical absorption strength peak wavelength thresholds.

2. The hand-held portable toxic element detection system of claim 1, wherein the first portion of the housing is a handle.

3. The hand-held portable toxic element detection system of claim 1, wherein the bottom surface of the first portion of the housing further comprises a rubber handgrip.

4. The hand-held portable toxic element detection system of claim 1, wherein the plurality of LED light indicators comprises:
    a red LED configured to indicate the system is on;
    a yellow LED configured to indicate the system is scanning; and
    a green LED configured to indicate the scanning is complete.

5. The hand-held portable toxic element detection system of claim 1, wherein the plurality of LED light indicators are positioned between the LCD screen and the speaker.

6. The hand-held portable toxic element detection system of claim 1, wherein the sample is plastic.

7. The hand-held portable toxic element detection system of claim 1, wherein the camera is a Raspberry Pi camera.

8. The hand-held portable toxic element detection system of claim 1, wherein the microcontroller is a Raspberry Pi microcontroller.

9. The hand-held portable toxic element detection system of claim 1, wherein the microcontroller is further configured to send a type of toxic chemicals detected in the sample and its toxicity level to the LCD screen to be displayed thereon.

10. A method for detecting for a presence of a toxic element in a sample, the method comprising:
    providing a sample to be tested;
    turning on a hand-held portable toxic element detection system by pressing an on/off button disposed thereon;
    directing an UV-VIS LED illuminator from the hand-held portable toxic element detection system toward the sample to be tested;
    pressing a scan switch disposed on the hand-held portable toxic element detection system to initiate a scanning process, wherein the scanning process comprises emitting UV light from the UV-VIS LED illuminator onto the sample to be tested as incident light;
    capturing a portion of the incident light being reflected from the sample as reflected light using a frinGOe interferometer disposed on the hand-held portable toxic element detection system and converting the reflected light to an interferogram spectrum;

collecting the interferogram spectrum using a camera disposed within the hand-held portable toxic element detection system;

retrieving the interferogram spectrum from the camera via a microcontroller, the microcontroller and a RAM database memory disposed within the hand-held portable toxic element detection system;

transforming the interferogram spectrum to absorption wavelength spectrum using Fourier transformation via the microcontroller, wherein the absorption wavelength spectrum comprises an absorption peak wavelength spectrum and an absorption strength peak wavelength spectrum;

comparing, using the microcontroller, the absorption peak wavelength spectrum and the absorption strength peak wavelength spectrum with absorption peak wavelength spectrum and absorption strength peak wavelength spectrum data stored in the RAM database memory, wherein the stored data absorption peak wavelength spectrum and the absorption strength peak wavelength spectrum data indicate a presence of toxic chemicals and a corresponding level of toxicity of the toxic chemicals in the sample, respectively;

normalizing the absorption strength peak wavelength spectrum according to the stored data absorption strength peak wavelength spectrum data using the microcontroller, wherein the normalization represents an amount of toxic chemicals in the sample;

comparing the normalized absorption strength peak wavelength spectrum with stored allowable toxic chemical absorption strength peak wavelength thresholds;

sending a visual and audio message indicating that the sample is safe to use to an LCD screen and a speaker, respectively, when the normalized absorption strength peak wavelength spectrum for all toxic chemicals in the sample is less than the stored allowable toxic chemical absorption strength peak wavelength thresholds;

and sending a visual and audio message indicating that the sample is not safe to use to the LCD screen and the speaker, respectively, when the normalized absorption strength peak wavelength spectrum for any toxic chemical in the sample is greater than the stored allowable toxic chemical absorption strength peak wavelength thresholds.

11. The method for detecting for a presence of a toxic element in a sample of claim 10, wherein the hand-held portable toxic element detection system further comprises:

a housing comprising a first portion, second portion, and third portion, wherein the second portion of the housing is located between the first portion of the housing and the third portion of the housing, the first portion, second portion, and third portion of the housing each comprising a top surface and a bottom surface;

the top surface and bottom surface of the first portion of the housing comprises the on/off button and the scan switch, respectively;

the top surface of the second portion of the housing comprises the speaker;

the top surface of the third portion of the housing comprises the LCD screen and a plurality of LED light indicators;

the bottom surface of the third portion of the housing comprises the UV-VIS LED illuminator and the frinGOe interferometer;

the camera is disposed within the housing;

and wherein the microcontroller is in communication with the camera, RAM database memory, speaker, LCD screen, UV-VIS LED illuminator, and frinGOe interferometer.

12. The method for detecting for a presence of a toxic element in a sample of claim 11, wherein the first portion of the housing is a handle.

13. The method for detecting for a presence of a toxic element in a sample of claim 11, wherein the bottom surface of the first portion of the housing further comprises a rubber handgrip.

14. The method for detecting for a presence of a toxic element in a sample of claim 11, wherein the plurality of LED light indicators comprises:

a red LED configured to indicate the system is on;

a yellow LED configured to indicate the system is scanning; and a green LED configured to indicate the scanning is complete.

15. The method for detecting for a presence of a toxic element in a sample of claim 11, wherein the plurality of LED light indicators are positioned between the LCD screen and the speaker.

16. The method for detecting for a presence of a toxic element in a sample of claim 11, wherein the sample is plastic.

17. The method for detecting for a presence of a toxic element in a sample of claim 11, wherein the camera is a Raspberry Pi camera.

18. The method for detecting for a presence of a toxic element in a sample of claim 11, wherein the microcontroller is a Raspberry Pi microcontroller.

19. The method for detecting for a presence of a toxic element in a sample of claim 11, wherein the microcontroller is further configured for sending a type of toxic chemicals detected in the sample and its toxicity level to the LCD screen to be display thereon.

* * * * *